(12) United States Patent
Hayashi

(10) Patent No.: US 12,507,888 B2
(45) Date of Patent: Dec. 30, 2025

(54) EYE-GAZE DETECTING DEVICE, EYE-GAZE DETECTING METHOD, AND COMPUTER-READABLE STORAGE MEDIUM

(71) Applicant: JVCKENWOOD Corporation, Yokohama (JP)

(72) Inventor: Takahiro Hayashi, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 534 days.

(21) Appl. No.: 18/072,740

(22) Filed: Dec. 1, 2022

(65) Prior Publication Data
US 2023/0098675 A1 Mar. 30, 2023

Related U.S. Application Data

(63) Continuation of application No. PCT/JP2021/008893, filed on Mar. 8, 2021.

(30) Foreign Application Priority Data

Jun. 5, 2020 (JP) .................. 2020-098568

(51) Int. Cl.
*A61B 3/113* (2006.01)
*A61B 3/00* (2006.01)
(Continued)

(52) U.S. Cl.
CPC ............ *A61B 3/113* (2013.01); *A61B 3/0091* (2013.01); *A61B 3/107* (2013.01); *A61B 3/112* (2013.01); *A61B 3/14* (2013.01)

(58) Field of Classification Search
CPC ....... A61B 3/113; A61B 3/0091; A61B 3/107; A61B 3/112; A61B 3/14; A61B 3/0025;
(Continued)

(56) References Cited

U.S. PATENT DOCUMENTS

2011/0149239 A1 6/2011 Neal et al.
2012/0303009 A1 11/2012 Liu et al.
(Continued)

FOREIGN PATENT DOCUMENTS

JP 2020-038734 3/2020
WO 2020/121975 6/2020

OTHER PUBLICATIONS

International Search Report and Written Opinion for International Application No. PCT/JP2021/008893 mailed on May 18, 2021, 5 pages.

*Primary Examiner* — Thomas K Pham
*Assistant Examiner* — Kuei-Jen L Edenfield
(74) *Attorney, Agent, or Firm* — Amin, Turocy & Watson, LLP

(57) ABSTRACT

An eye-gaze detecting device includes an image data acquisition unit configured to acquire image data of an eyeball of a test subject irradiated with detection light; a position detection unit configured to detect, from the image data, position data of pupil center of the eyeball and position data of corneal reflection center; a pupil diameter calculation unit configured to calculate a pupil diameter of the test subject from the image data; a curvature center calculation unit configured to calculate a corneal curvature radius corresponding to the pupil diameter, and obtain position data of corneal curvature center based on the position data of the corneal reflection center and the corneal curvature radius; and a point-of-gaze detection unit configured to calculate, based on the position data of the pupil center and corneal curvature center, position data of point of gaze of the test subject on a plane including a display unit.

4 Claims, 11 Drawing Sheets

(51) Int. Cl.
 *A61B 3/107* (2006.01)
 *A61B 3/11* (2006.01)
 *A61B 3/14* (2006.01)

(58) Field of Classification Search
 CPC  A61B 3/00; A61B 3/11; A61B 3/1005; A61B 3/101; A61B 3/1015; A61B 3/1025; A61B 3/111; G06F 3/013; G06F 3/01; G06V 40/193; G06V 40/18; G06V 40/19; G06V 10/25; G06V 10/141; G06V 40/165; G06V 40/16; G06T 2207/10012; G06T 7/73; G06T 2207/30201; G02C 13/003; G02C 13/005; G01B 11/026; G01B 11/02
 USPC ................................................ 351/204–221
 See application file for complete search history.

(56) References Cited

U.S. PATENT DOCUMENTS

| | | | |
|---|---|---|---|
| 2013/0114043 A1* | 5/2013 | Balan | H04N 13/344 351/210 |
| 2015/0136990 A1* | 5/2015 | Blixt | G01S 17/66 250/342 |
| 2018/0239427 A1 | 8/2018 | Hakoshima | |
| 2019/0206082 A1 | 7/2019 | Hakoshima | |

\* cited by examiner

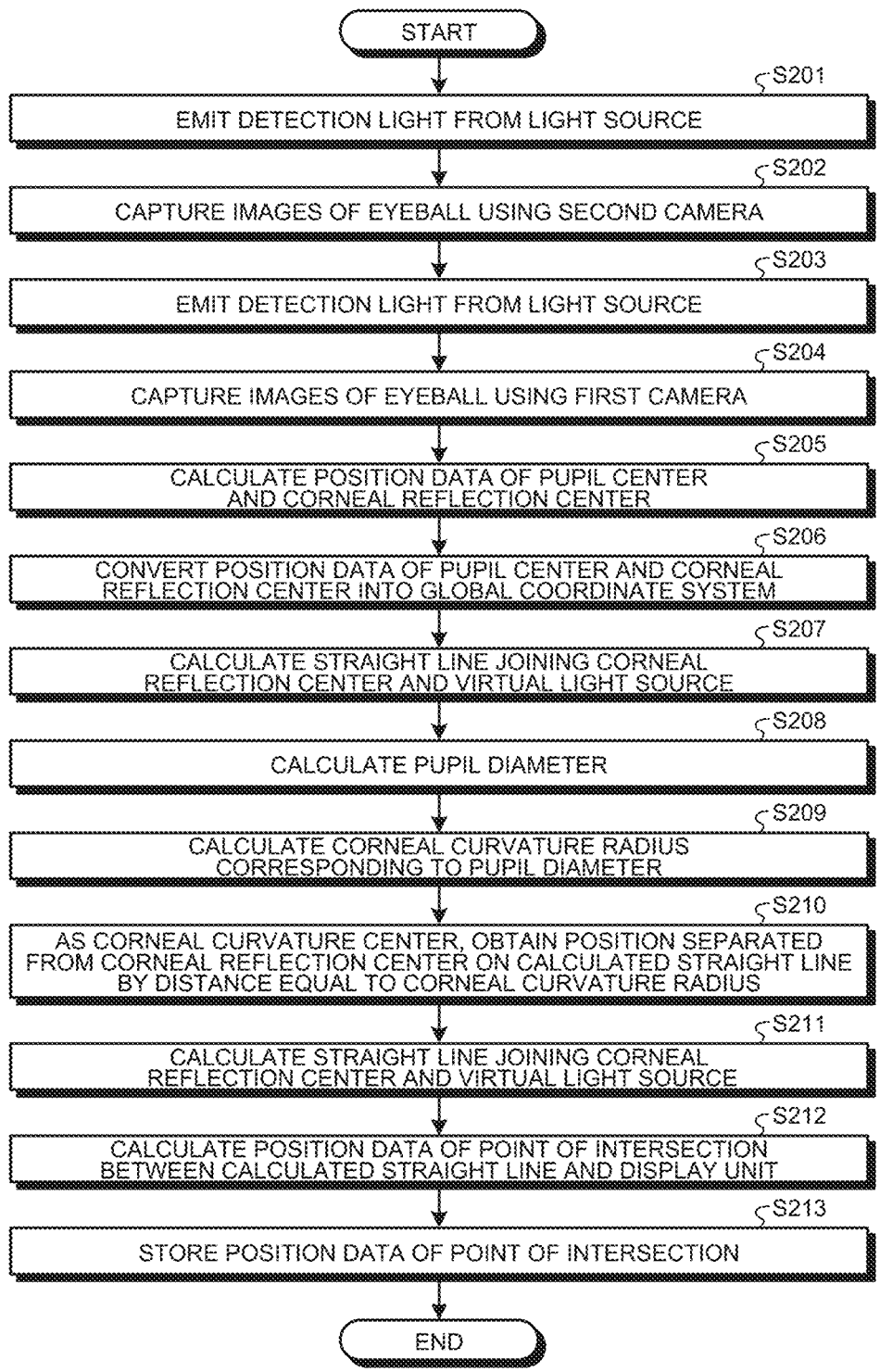

EYE-GAZE DETECTING DEVICE, EYE-GAZE DETECTING METHOD, AND COMPUTER-READABLE STORAGE MEDIUM

CROSS-REFERENCE TO RELATED APPLICATIONS

This application is a Continuation of PCT International Application No. PCT/JP2021/008893 filed on Mar. 8, 2021 which claims the benefit of priority from Japanese Patent Application No. 2020-098568 filed on Jun. 5, 2020, the entire contents of which are incorporated herein by reference.

BACKGROUND

The present disclosure is related to an eye-gaze detecting device, an eye-gaze detecting method, and a computer-readable storage medium.

An eye-gaze detecting device is known that irradiates an eyeball of the test subject with a detection light; calculates the pupil center and the corneal curvature center from the image of the eye irradiated with the detection light; and detects, as the eye-gaze direction of the test subject, the vector directed from the corneal curvature center toward the pupil center (for example, refer to Japanese Laid-open Patent Publication No. 2020-38734). In such an eye-gaze detecting device, in order to track the eye-gaze of the test subject or the operator with more accuracy, a method has been proposed in which each test subject is made to gaze at a target image displayed in a display unit and, only after the calibration operation is performed for that test subject, an eye-gaze detecting operation is performed.

The brightness and of the display unit and the brightness of the surrounding is different during the calibration operation than during the eye-gaze detecting operation; and the pupil diameter of the test subject changes according to the brightness. Accompanying a change in the pupil diameter, sometime the position of the pupil center also changes. For example, when the pupil diameter of the test subject during the calibration operation is different than the pupil diameter during the eye-gaze detecting operation, if the data obtained during the calibration operation is used during the eye-gaze detecting, then there may occur a decline in the detecting accuracy at the time of detecting the eye-gaze of the test subject.

SUMMARY

An eye-gaze detecting device according to an embodiment includes: a display unit configured to display an image; a light source configured to irradiate at least one eyeball of a test subject with detection light; an image data acquisition unit configured to acquire image data of the eyeball irradiated with the detection light; a position detection unit configured to detect, from the acquired image data, position data of pupil center indicating a center of pupil of the eyeball irradiated with the detection light and position data of corneal reflection center indicating a center of corneal reflection; a pupil diameter calculation unit configured to calculate a pupil diameter of the test subject from the acquired image data; a curvature center calculation unit configured to calculate, based on the calculated pupil diameter, a corneal curvature radius corresponding to the calculated pupil diameter, and obtain position data of corneal curvature center based on the position data of the corneal reflection center and a value of the calculated corneal curvature radius; and a point-of-gaze detection unit configured to calculate, based on the position data of the pupil center and the position data of the corneal curvature center, position data of point of gaze of the test subject on a plane which includes the display unit.

An eye-gaze detecting method according to an embodiment includes: irradiating at least one eyeball of a test subject with detection light; acquiring image data of the eyeball irradiated with the detection light; detecting, from the acquired image data, position data of pupil center indicating a center of pupil of the eyeball irradiated with the detection light and position data of corneal reflection center indicating a center of corneal reflection; calculating a pupil diameter of the test subject from the acquired image data; calculating, based on the calculated pupil diameter, a corneal curvature radius corresponding to the calculated pupil diameter to obtain position data of corneal curvature center based on the position data of the corneal reflection center and a value of the calculated corneal curvature radius; and calculating, based on the position data of the pupil center and the position data of the corneal curvature center, position data of point of gaze of the test subject on a plane which includes a display unit.

A non-transitory computer-readable storage medium according to an embodiment stores a computer program causing a computer to execute: irradiating at least one eyeball of a test subject with detection light; acquiring image data of the eyeball irradiated with the detection light; detecting, from the acquired image data, position data of pupil center indicating a center of pupil of the eyeball irradiated with the detection light and position data of corneal reflection center indicating a center of corneal reflection; calculating a pupil diameter of the test subject from the acquired image data; calculating, based on the calculated pupil diameter, a corneal curvature radius corresponding to the calculated pupil diameter to obtain position data of corneal curvature center based on the position data of the corneal reflection center and a value of the calculated corneal curvature radius; and calculating, based on the position data of the pupil center and the position data of the corneal curvature center, position data of point of gaze of the test subject on a plane which includes a display unit.

BRIEF DESCRIPTION OF THE DRAWINGS

FIG. 16 is a flowchart for explaining an example of the eye-gaze detecting operation performed in the eye-gaze detecting method according to the present embodiment.

DETAILED DESCRIPTION

An exemplary embodiment of an eye-gaze detecting device, an eye-gaze detecting method, and an eye-gaze detecting program according to the present disclosure is described below with reference to the accompanying drawings. However, the present invention is not limited by the embodiment described below. Moreover, the constituent elements explained in the embodiment include the constituent elements that are simple and are replaceable by a person skilled in the art, or include practically identical constituent elements.

In the following explanation, the positional relationship among different parts is explained by setting a three-dimensional global coordinate system. The direction parallel to a first axis of a predetermined face is treated as the X-axis direction; the direction parallel to a second axis of a predetermined face, which is orthogonal to the first axis, is treated as the Y-axis direction; and the direction parallel to a third axis, which is orthogonal to the first and second axes, is treated as the Z-axis direction. Herein, the predetermined face includes the XY plane.

Eye-Gaze Detecting Device

Figure 1:
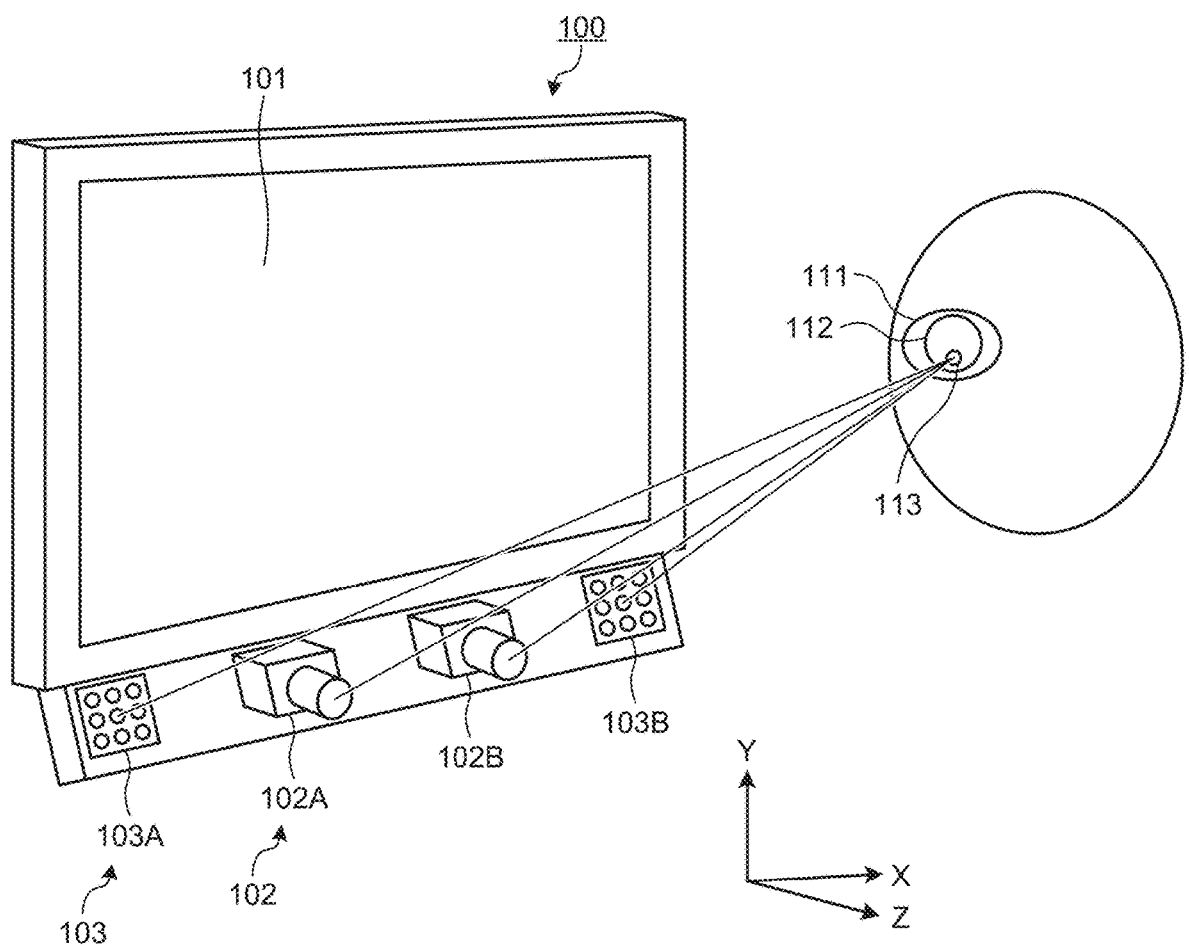
FIG. 1 is a perspective view that schematically illustrates an example of an eye-gaze detecting device according to an embodiment.

FIG. 1 is a perspective view that schematically illustrates an example of an eye-gaze detecting device 100 according to the present embodiment. As illustrated in FIG. 1, the eye-gaze detecting device 100 includes a display unit 101, a stereo camera device 102, and an illumination device 103.

The display unit 101 includes a flat panel display such as a liquid crystal display (LCD) or an organic electroluminescence display (OLED). In the present embodiment, the display unit 101 displays images. Moreover, in the present embodiment, the display unit 101 displays, for example, an index meant for evaluating the visual performance of the test subject. The display unit 101 is positioned to be practically parallel to the XY plane. The X-axis direction represents the horizontal direction of the display unit 101; the Y-axis direction represents the vertical direction of the display unit 101; and the Z-axis direction represents the depth direction orthogonal to the display unit 101.

The stereo camera device 102 includes a first camera 102A and a second camera 102B. The stereo camera device 102 is disposed on the lower side of the display unit 101. The first camera 102A and the second camera 102B are disposed in the X-axis direction. The first camera 102A is disposed in the negative X-axis direction with reference to the second camera 102B. The first camera 102A as well as the second camera 102B includes an infrared camera; an optical system capable of transmitting near-infrared light having the wavelength of, for example, 850 [nm]; and an imaging device capable of receiving near-infrared light.

The illumination device (light source) 103 includes a first light source 103A and a second light source 103B. The illumination device 103 is disposed on the lower side of the display unit 101. The first light source 103A and the second light source 103B are disposed in the X-axis direction. The first light source 103A is disposed in the negative X-axis direction with reference to the first camera 102A. The second light source 103B is disposed in the positive X-axis direction with reference to the second camera 102B. Each of the first light source 103A and the second light source 103B includes an LED (light emitting diode) light source, and is capable of emitting near-infrared light having the wavelength of, for example, 850 [nm]. Meanwhile, the first light source 103A and the second light source 103B can be disposed in between the first camera 102A and the second camera 102B. Moreover, the stereo camera device 102 can be disposed on the upper side of the display unit 101.

The illumination device 103 emits near-infrared light, which represents the detection light, that illuminates an eyeball 111 of the test subject. When the detection light emitted from the first light source 103A falls on the eyeball 111, the stereo camera device 102 captures images of some part of the eyeball 111 (hereinafter, referred to as "eyeball" in whole) using the second camera 102B; and, when the detection light emitted from the second light source 103B falls on the eyeball 111, the stereo camera device 102 captures images of the eyeball 111 using the first camera 102A.

Meanwhile, a frame synchronization signal is output from at least one of the first camera 102A and the second camera 102B. The first light source 103A and the second light source 103B emit the detection light based on the frame synchronization signal. When the detection light emitted from the second light source 103B falls on the eyeball 111, the first camera 102A obtains the image data of the eyeball 111. When the detection light emitted from the first light source 103A falls on the eyeball 111, the second camera 102B obtains the image data of the eyeball 111.

When the detection light falls on the eyeball 111, some of the detection light reflects from a pupil 112; and the light coming from the pupil 112 enters the stereo camera device 102. Moreover, when the detection light falls on the eyeball 111, a corneal reflection image 113 representing a virtual image of the cornea is formed on the eyeball 111; and the light coming from the corneal reflection image 113 enters the stereo camera device 102.

If the relative positions of the first camera 102A and the second camera 102B with respect to the first light source 103A and the second light source 103B are set in an appropriate manner, then there is a decrease in the intensity of the light entering the stereo camera device 102 from the pupil 112, and there is an increase in the intensity of the light entering the stereo camera device 102 from the corneal reflection image 113. That is, the image of the pupil 112 that is captured by the stereo camera device 102 has low luminance, and the image of the corneal reflection image 113 has high luminance. Based on the luminance of the captured images, the stereo camera device 102 becomes able to detect the position of the pupil 112 and the position of the corneal reflection image 113.

Figure 2:
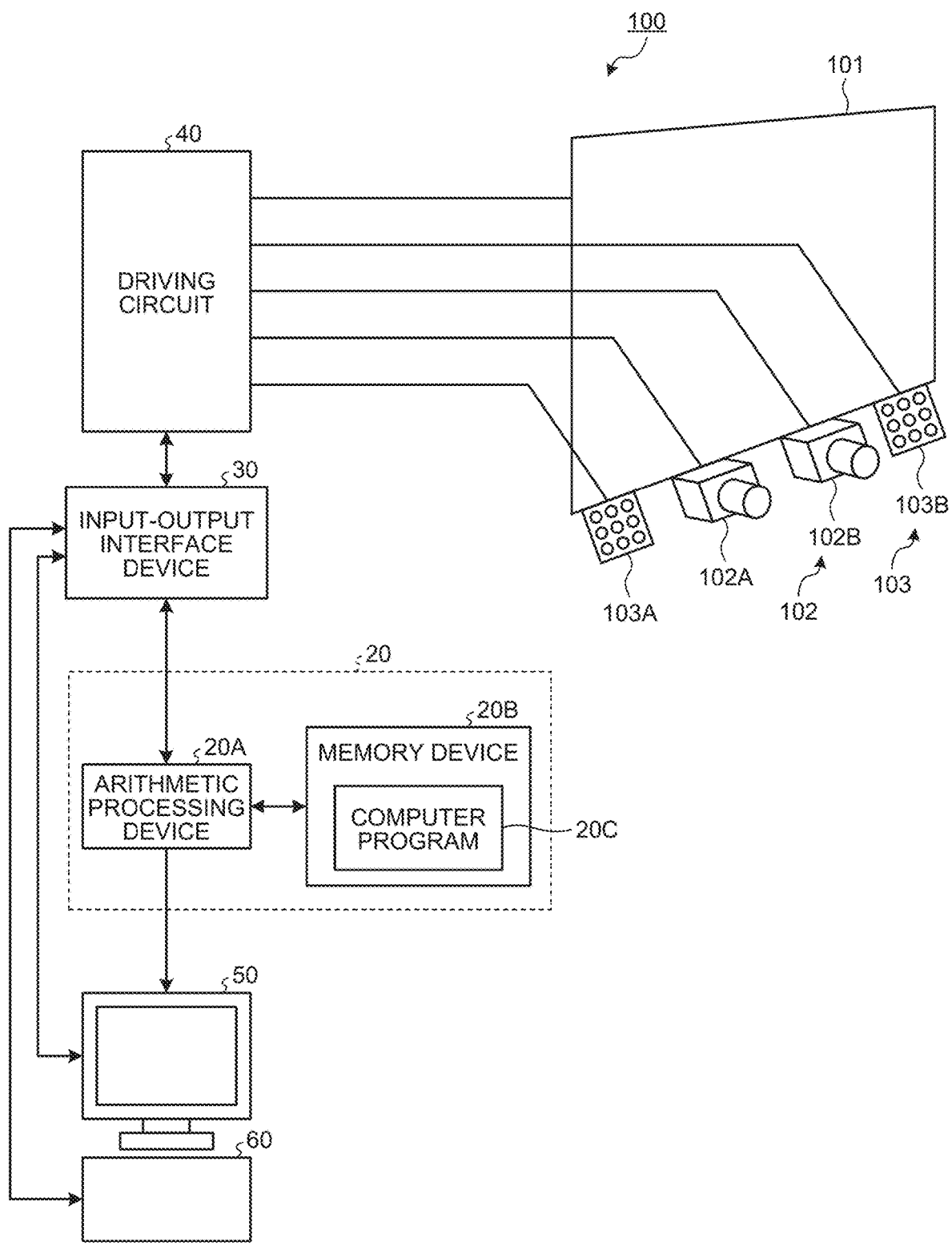
FIG. 2 is a diagram illustrating an exemplary hardware configuration of the eye-gaze detecting device according to the present embodiment.

FIG. 2 is a diagram illustrating an exemplary hardware configuration of the eye-gaze detecting device 100 according to the present embodiment. As illustrated in FIG. 2, the eye-gaze detecting device 100 includes the display unit 101, the stereo camera device 102, the illumination device 103, a computer system (control unit) 20, an input-output interface device 30, a driving circuit 40, an output device 50, and an input device 60.

The computer system 20, the driving circuit 40, the output device 50, and the input device 60 perform data communication via the input-output interface device 30. The computer system 20 includes an arithmetic processing device 20A and a memory device 20B. The arithmetic processing device 20A includes a microprocessor such as a CPU (central processing unit). The memory device 20B includes a memory or a storage such as a ROM (read only memory) and a RAM (random access memory). The arithmetic processing device 20A performs arithmetic processing according to a computer program 20C that is stored in the memory device 20B.

The driving circuit 40 generates a driving signal and outputs it to the display unit 101, the stereo camera device 102, and the illumination device 103. Moreover, the driving circuit 40 supplies the image data of the eyeball 111, which is captured by the stereo camera device 102, to the computer system 20 via the input-output interface device 30.

The output device 50 includes a display unit such as a flat panel display. Moreover, the output device 50 can also include a printing device. The input device 60 generates input data in response to being operated. The input device 60 includes a keyboard or a mouse meant for use in a computer system. Meanwhile, the input device 60 can be a touch sensor installed on the display screen of the output device 50 representing a display unit.

In the present embodiment, the display unit 101 and the computer system 20 are different devices. Alternatively, the display unit 101 and the computer system 20 can be configured in an integrated manner. For example, if the eye-gaze detecting device 100 is a tablet personal computer, then the computer system 20, the input-output interface device 30, the driving circuit 40, and the display unit 101 can be installed together in the tablet personal computer.

Figure 3:
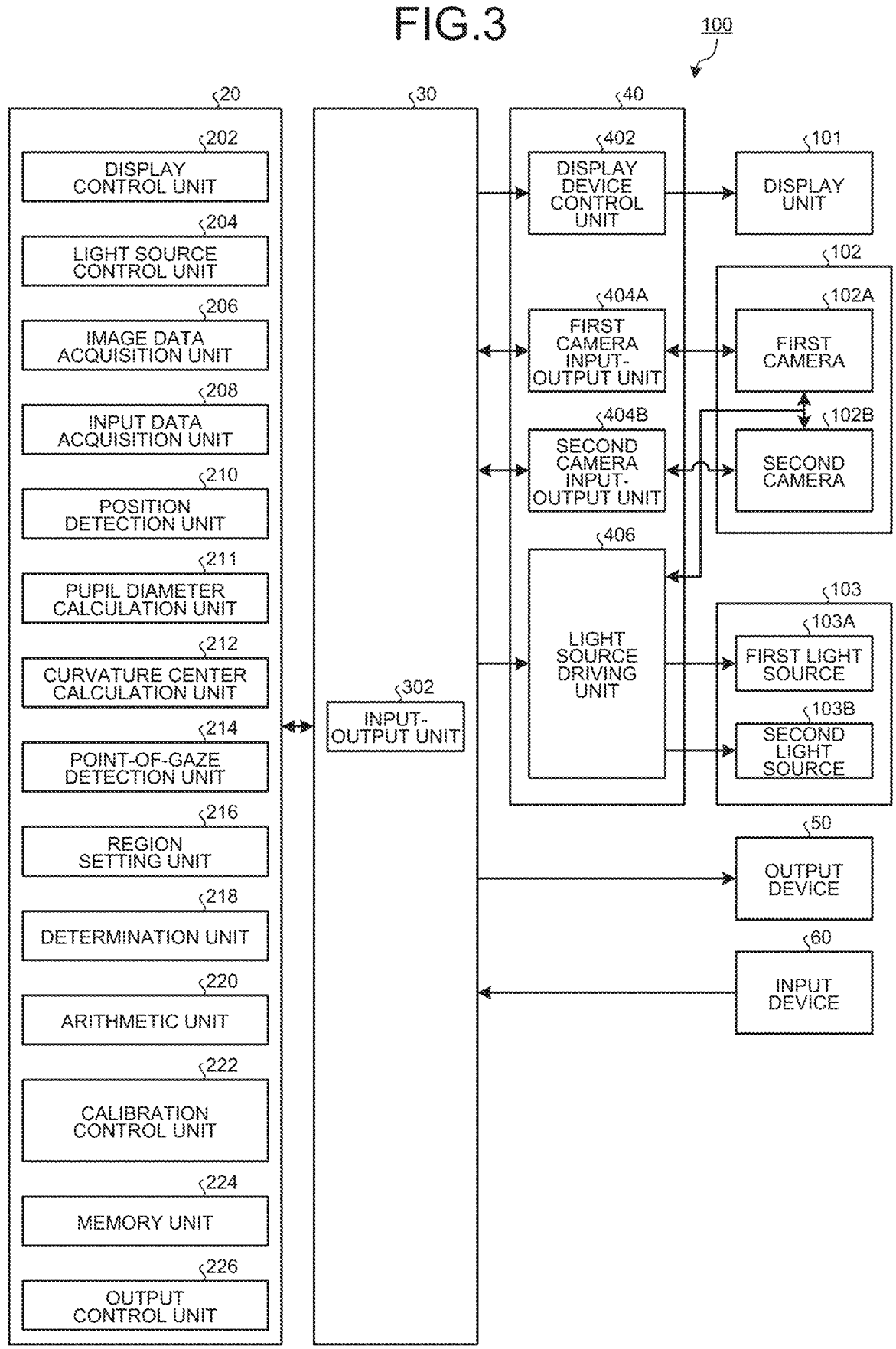
FIG. 3 is a functional block diagram illustrating an example of the eye-gaze detecting device according to the present embodiment.

FIG. 3 is a functional block diagram illustrating an example of the eye-gaze detecting device 100 according to the present embodiment. As illustrated in FIG. 3, the input-output interface device 30 includes an input-output unit 302. The driving circuit 40 includes: a display device driving unit 402 that generates a driving signal meant for driving the display unit 101, and outputs the driving signal to the display unit 101; a first camera input-output unit 404A that generates a driving signal meant for driving the first camera 102A, and outputs the driving signal to the first camera 102A; a second camera input-output unit 404B that generates a driving signal meant for driving the second camera 102B, and outputs the driving signal to the second camera 102B; and a light source driving unit 406 that generates a driving signal meant for driving the first light source 103A and the second light source 103B, and outputs the driving signal to the first light source 103A and the second light source 103B. Moreover, the first camera input-output unit 404A supplies the image data of the eyeball 111, which is captured by the first camera 102A, to the computer system 20 via the input-output unit 302. The second camera input-output unit 404B supplies the image data of the eyeball 111, which is captured by the second camera 102B, to the computer system 20 via the input-output unit 302.

The computer system 20 controls the eye-gaze detecting device 100. The computer system 20 includes a display control unit 202, a light source control unit 204, an image data acquisition unit 206, an input data acquisition unit 208, a position detection unit 210, a curvature center calculation unit 212, a point-of-gaze detection unit 214, a region setting unit 216, a determination unit 218, an arithmetic unit 220, a calibration control unit 222, a memory unit 224, and an output control unit 226. The functions of the computer system 20 are implemented due to the arithmetic processing device 20A and the memory device 20B.

The display control unit 202 displays, in the display unit 101, an image to be shown to the test subject. For example, during the calibration operation, the display control unit 202 can display the target image at a plurality of positions (target positions) in the display unit 101. The display control unit 202 can display the target image by sequentially varying the target position one by one, or can perform the display in such a way that the target image sequentially moves to a plurality of target positions. The number of target positions for displaying the target image can be set according to, for example, the input performed by the operator using the input device 60.

The light source control unit 204 controls the light source driving unit 406 for controlling the operating condition of the first light source 103A and the second light source 103B. The light source control unit 204 controls the first light source 103A and the second light source 103B in such a way that they emit the detection light at mutually different timings.

The image data acquisition unit 206 acquires, from the stereo camera device 102 via the input-output unit 302, the image data of the eyeball 111 of the test subject as captured by the stereo camera device 102 that includes the first camera 102A and the second camera 102B.

The input data acquisition unit 208 acquires, from the input device 60 via the input-output unit 302, the input data generated as a result of operating the input device 60.

The position detection unit 210 detects the position data of the pupil center based on the image data of the eyeball 111 as acquired by the image data acquisition unit 206. Moreover, the position detection unit 210 detects the position data of the corneal reflection center based on the image data of the eyeball 111 as acquired by the image data acquisition unit 206. The pupil center represents the center of the pupil 112. The corneal reflection center represents the center of the corneal reflection image 113. Herein, regarding the eyeball 111 irradiated with the detection light, the position detection unit 210 detects the position data of the pupil center and the position data of the corneal reflection center.

The pupil diameter calculation unit 211 calculates the pupil diameter of the test subject based on the image data of the eyeball 111 as acquired by the image data acquisition unit 206. The pupil diameter calculation unit 211 can perform, for example, image processing to calculate the dimensions of the pupil and, under the assumption that the pupil is circular in shape, can calculate the pupil diameter from the dimensions.

The curvature center calculation unit 212 obtains the position data of the corneal curvature center during the eye-gaze detecting operation as well as during the calibration operation. During the eye-gaze detecting operation, based on the pupil diameter calculated by the pupil diameter calculation unit 211, the curvature center calculation unit 212 calculates the corneal curvature radius corresponding to the pupil diameter. In that case, based on a predetermined correlation between the pupil diameter and the corneal curvature radius, the curvature center calculation unit 212 can obtain the corneal curvature radius corresponding to the calculated pupil diameter. The predetermined correlation can be obtained, for example, in advance during the calibration operation (explained later). The curvature center calculation unit 212 obtains the position data of the corneal curvature center based on the position data of the corneal reflection center detected by the position detection unit 210 and based on the calculated value of the corneal curvature radius.

Moreover, during the calibration operation, the curvature center calculation unit 212 obtains a first straight line that joins the reference position of the illumination device 103 to the corneal reflection center detected by the position detection unit 210. Moreover, the curvature center calculation unit 212 obtains a second straight line that joins the target image to the pupil center detected in the operation explained above, and obtains the point of intersection between the first straight line and the second straight line as the position data of the corneal curvature center. Examples of the reference position of the illumination device 103 include the position of a virtual light source 103V (explained later, see FIG. 4). Meanwhile, the calibration control unit 222 calculates the distance between the corneal curvature center and the pupil center as a corneal curvature radius R.

The point-of-gaze detection unit 214 detects the position data of the point of gaze of the test subject based on the image data of the eyeball 111 as acquired by the image data acquisition unit 206. In the present embodiment, the position data of the point of gaze implies the position data of the point of intersection between the eye-gaze vectors of the test subject, which are defined in the three-dimensional global coordinate system, and the plane that includes the display unit 101. Herein, based on the position data of the pupil center and the position data of the corneal curvature center as acquired from the image data of the eyeball 111, the point-of-gaze detection unit 214 detects the eye-gaze vectors of the right and left eyeballs 111 of the test subject. After the eye-gaze vectors are detected, the point-of-gaze detection unit 214 detects the position data of the point of gaze that indicates the point of intersection between the eye-gaze vectors and the display unit 101.

During the display period in which the target image is displayed in the display unit 101; the region setting unit 216 sets, in the display unit 101, a correspondence region that corresponds to the target image being displayed in the display unit 101.

During the display period in which the target image is displayed in the display unit 101, based on the position data of the viewpoint, the determination unit 218 determines whether or not the point of gaze is present within the correspondence region. For example, the determination unit 218 determines, at regular intervals, whether or not the correspondence region is present within the correspondence region. The regular interval can be set equal to, for example, the period of the frame synchronization signals (for example, 50 [msec]) output from the first camera 102A and the second camera 102B.

Based on the determination data obtained by the determination unit 218, the arithmetic unit 220 obtains the determination count indicating the number of times for which the point of gaze is determined to be present within the correspondence region. The arithmetic unit 220 has a counter for acquiring the determination count regarding the correspondence region.

The calibration control unit 222 controls the other constituent elements and ensures that the calibration operation is performed prior to the eye-gaze detecting operation. Regarding the calibration operation, the explanation is given later.

The memory unit 224 is used to store a variety of data and programs related to the eye-gaze detecting explained above. For example, in the memory unit 224, the data regarding the image displayed in the display unit 101 can be stored for each color of the background image and for and each luminance value. Moreover, the memory unit 224 is used to store the position data of the point of gaze calculated during each instance of the calibration operation. Furthermore, in the memory unit 224, the pupil diameter and the corneal curvature radius calculated during each instance of the calibration operation can be stored in a corresponding manner to each color of the background image and each luminance value.

The memory unit 224 is also used to store an eye-gaze detecting program that causes a computer to execute the following operations: an operation for irradiating at least one eyeball of the test subject with the detecting light; an operation for acquiring the image data of the eyeball irradiated with the detection light; an operation for detecting, from the acquired image data, the position data of the pupil center, which indicates the center of the pupil of the eyeball irradiated with the detection light, and the position data of the corneal reflection center, which indicates the center of the corneal reflection; an operation for calculating the pupil diameter of the test subject from the acquired image data; and an operation in which the corneal curvature radius corresponding to the pupil diameter is calculated based on the pupil diameter, in which the position data of the corneal curvature center is obtained based on the position data of the corneal reflection center and the calculated value of the corneal curvature radius, and in which the position data of the point of gaze of the test subject on the plane including the display unit is calculated based on the position data of the pupil center and the position data of the corneal curvature center.

The output control unit 226 outputs the data to at least either the display unit 101 or the output device 50.

Given below is the explanation of the overview of the operations performed by the curvature center calculation unit 212 according to the present embodiment. In the present embodiment, the explanation is given about the case in which the eyeball 111 is illuminated by the first light source 103A and the second light source 103B, and images of the eyeball 111 are captured by two cameras, namely, the first camera 102A and the second camera 102B. Meanwhile, the number of light sources and the number of cameras is not limited to two, and the same explanation is applicable when there is a single light source and a single camera. The following explanation is given about the principle of the eye-gaze detecting method according to the present embodiment.

Figure 4:
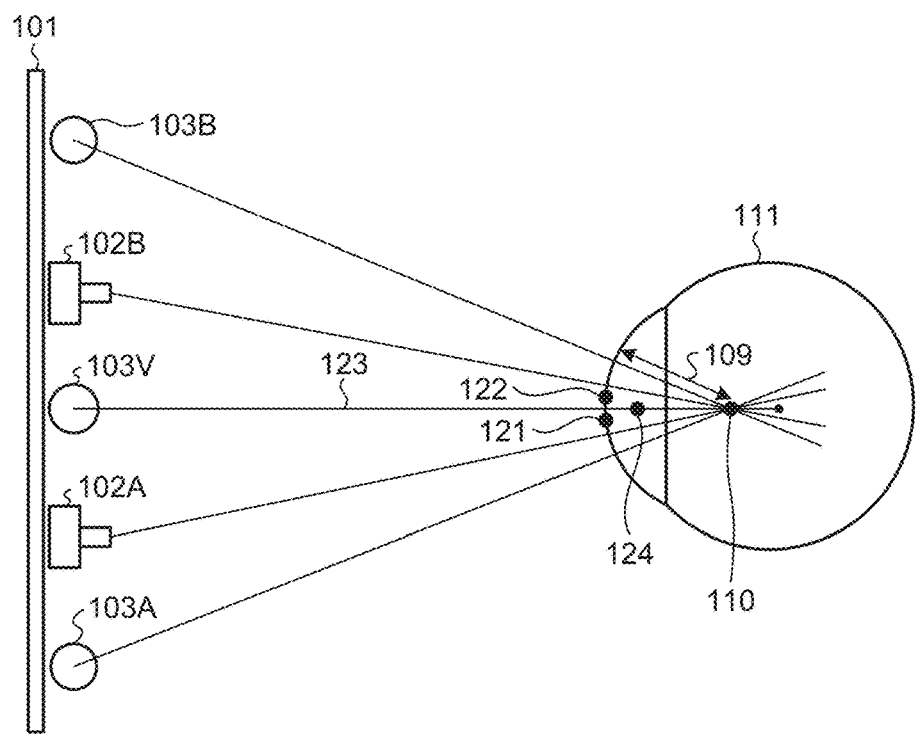
FIG. 4 is a diagram illustrating an example in which an eyeball is illuminated by a first light source and a second light source.

FIG. 4 is a diagram illustrating an example in which the eyeball 111 is illuminated by the first light source 103A and the second light source 103B. As illustrated in FIG. 4, in the present embodiment, the first camera 102A and the second light source 103B as well as the second camera 102B and the first light source 103A are placed to be bilaterally symmetrical with respect to the straight line passing through the intermediate position of the first camera 102A and the second camera 102B. At the intermediate position of the first camera 102A and the second camera 102B, the virtual light source 103V (the reference position of the light source) can be deemed to be present.

A corneal reflection center 121 represents the corneal reflection center in the image of the eyeball 111 captured by the second camera 102B. A corneal reflection center 122 represents the corneal reflection center in the image of the eyeball 111 captured by the first camera 102A. A corneal reflection center 124 represents the corneal reflection center corresponding to the virtual light source 103V.

The position data of the corneal reflection center 124 is calculated based on the position data of the corneal reflection center 121 and the position data of the corneal reflection center 122 as captured by the stereo camera device 102. The stereo camera device 102 detects the position data of the corneal reflection center 121 and the position data of the corneal reflection center 122 in the three-dimensional local coordinate system defined in the stereo camera device 102. Regarding the stereo camera device 102, camera correction is performed in advance according to the stereo calibration method, and a conversion parameter is calculated for converting the three-dimensional local coordinate system of the stereo camera device 102 into the three-dimensional global coordinate system. The conversion parameter is stored in the memory unit 224. Thus, using the conversion parameter, the curvature center calculation unit 212 converts the position data of the corneal reflection center 121 and the position data of the corneal reflection center 122, which are captured by the stereo camera device 102, into sets of position data in the three-dimensional global coordinate system. Then, based on the position data of the corneal reflection center 121 and the position data of the corneal reflection center 122 defined in the three-dimensional global coordinate system, the curvature center calculation unit 212 calculates the position data of the corneal reflection center 124 in the three-dimensional global coordinate system.

A corneal curvature center 110 is present on a straight line 123 that joins the virtual light source 103V and the corneal reflection center 124. The curvature center calculation unit 212 calculates, as the position of the corneal curvature center 110, the position at which the distance from the corneal reflection center 124 on the straight line 123 is equal to a predetermined value. Herein a corneal curvature radius 109 is used as the predetermined value. The corneal curvature radius 109 represents the distance between the corneal surface and the corneal curvature center 110. In the present embodiment, a value calculated during the calibration operation (explained later) is used as the corneal curvature radius 109.

Meanwhile, when only a single light source is installed, it is placed at the position of the virtual light source 103V, and the corneal curvature center 110 is calculated in an identical manner.

[Eye-Gaze Detecting Method]

Figure 5:
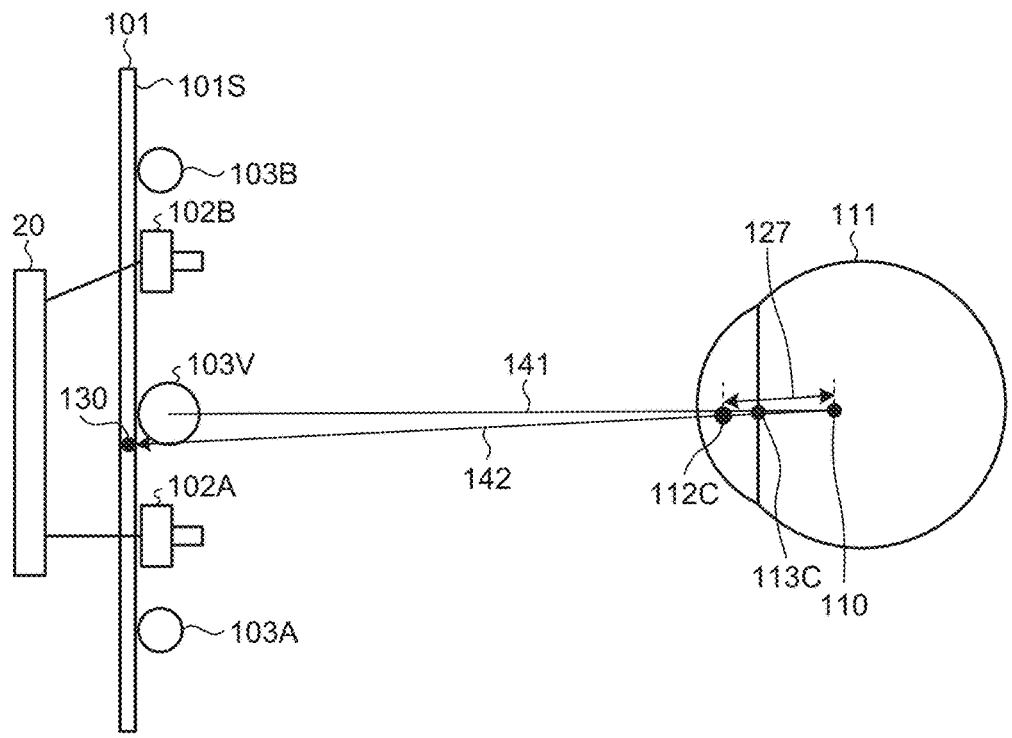
FIG. 5 is a schematic diagram for explaining the principle of a calibration operation according to the present embodiment.

In the eye-gaze detecting method according to the present embodiment, after the calibration operation is performed, a point-of-gaze detection operation is performed. Firstly, the explanation is given about the principle of the calibration operation. FIG. 5 is a schematic diagram for explaining the principle of the calibration operation according to the present embodiment. In the calibration operation, a target position 130 is set in order to make the test subject gaze at it. The target position 130 is defined in the three-dimensional global coordinate system. The display control unit 202 displays the target image at the target position 130.

The first light source 103A and the second light source 103B illuminate the eyeball 111. The first camera 102A and the second camera 102B capture images of the eyeball 111. For example, when the detection light is emitted from the first light source 103A, the second camera 102B captures images of the eyeball 111. On the other hand, when the detection light is emitted from the second light source 103B, the first camera 102A captures images of the eyeball 111. The position detection unit 210 detects the position data of a pupil center 112C and the position data of a corneal reflection center 113C based on the image data of the eyeball 111 as acquired by the image data acquisition unit 206. The position detection unit 210 converts each set of position data into the global coordinate system.

The curvature center calculation unit 212 calculates the position data of the corneal curvature center 110 based on the position data of the virtual light source 103V, the position data of the target position 130, the position data of the pupil center 112C, and the position data of the corneal reflection center 113C. More particularly, the curvature center calculation unit 212 obtains a first straight line 141 that joins the virtual light source 103V and the corneal reflection center 113C. Moreover, the curvature center calculation unit 212 obtains a second straight line 142 that joins the target position 130 and the pupil center 112C. Then, the curvature center calculation unit 212 obtains the point of intersection between the first straight line 141 and the second straight line 142 as the position data of the corneal curvature center 110. Subsequently, the curvature center calculation unit 212 calculates the distance between the corneal curvature center 110 and the pupil center 112C as a corneal curvature radius 127. The point-of-gaze detection unit 214 obtains the straight line joining the pupil center 112C and the corneal curvature center 110, and calculates the position data of the point of intersection between that straight line and the display unit 101 as the position data of the point of gaze.

The determination unit 218 determines whether or not the calculated position data of the point of gaze is present within the correspondence region. Herein, based on the determination count obtained by the arithmetic unit 220, the determination unit 218 determines whether or not, regarding each target image, the point of gaze is present within the correspondence region. For example, regarding each target image, if the determination count indicating the number of times for which the point of gaze is determined to be present within the correspondence region is equal to or greater than a certain percentage; then the determination unit 218 determines that, regarding the concerned target image, the point of gaze is present within the correspondence region. On the other hand, regarding each target image, if the determination count indicating the number of times for which the point of gaze is determined to be present within the correspondence region is smaller than a certain percentage; then the determination unit 218 determines that, regarding the concerned target image, the point of gaze is not present within the correspondence region. If it is determined that the point of gaze is present within the target region, then the calibration control unit 222 stores, as valid calibration data in the memory unit 224, various values such as the position data of the point of gaze and the corneal curvature radius 127 calculated at the time of acquiring the position data of the point of gaze.

Figure 6:
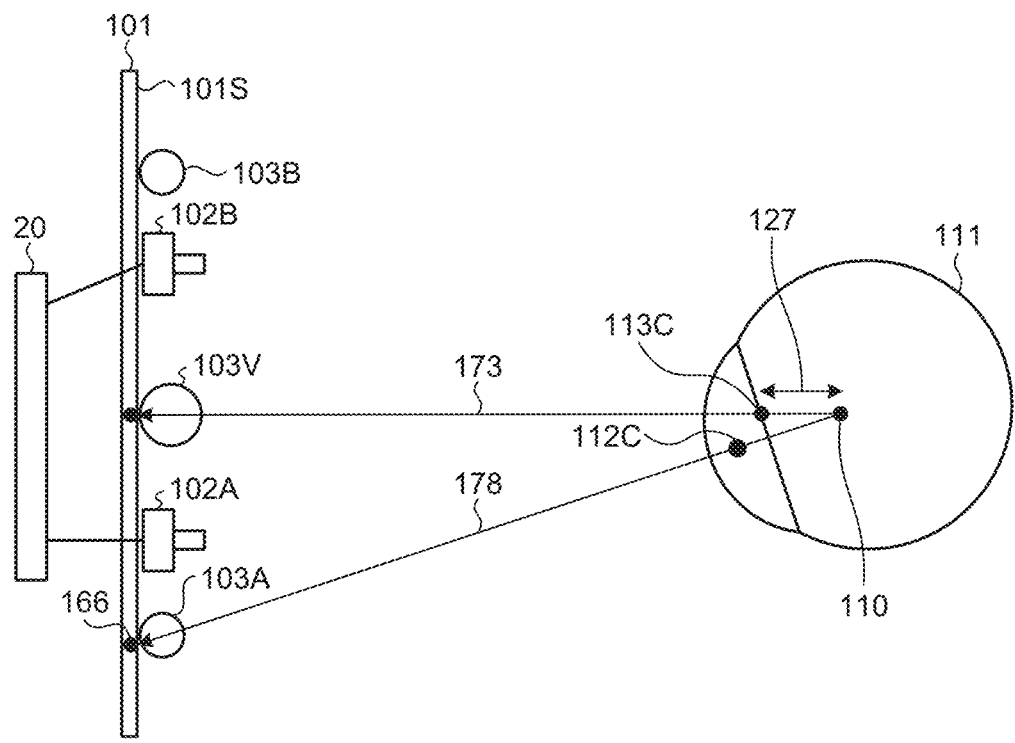
FIG. 6 is a schematic diagram for explaining the principle of an eye-gaze detecting operation according to the present embodiment.

Given below is the explanation about the principle of the eye-gaze detecting operation. FIG. 6 is a schematic diagram for explaining the principle of the eye-gaze detecting operation according to the present embodiment. In the eye-gaze detecting operation, in an identical manner to the calibration operation, the first light source 103A and the second light source 103B illuminate the eyeball 111. Then, the first camera 102A and the second camera 102B capture images of the eyeball 111. Based on the image data of the eyeball 111 as acquired by the image data acquisition unit 206, the position detection unit 210 detects the position data of the pupil center 112C and the position data of the corneal reflection center 113C.

The curvature center calculation unit 212 calculates the position data of the corneal curvature center 110 based on the position data of the virtual light source 103V, the position data of the pupil center 112C, the position data of the corneal reflection center 113C, and the corneal curvature radius 127 calculated in the calibration operation. More particularly, the curvature center calculation unit 212 obtains a straight line 173 that joins the virtual light source 103V and the corneal reflection center 113C. Moreover, the curvature center calculation unit 212 obtains, as the position data of the corneal curvature center 110, the position separated from the corneal reflection center 113C by a distance equivalent to the corneal curvature radius 127 with respect to the inside of the eyeball 111. The point-of-gaze detection unit 214 obtains a straight line 178 that joins the pupil center 112C and the corneal curvature center 110; and calculates, as the position data of the point of gaze, the position data of an intersection point 166 between the straight line 178 and the display unit 101.

There are times when the size of the pupil of the test subject changes according to the brightness of the display unit 101, that is, according to the factors pertaining to the display unit 101, such as the luminance of the display unit 101 and the color of a background image B1 displayed in the display unit 101. For example, when the brightness of the display unit 101 is relatively higher, the iris of the test subject expands and the pupil becomes relatively constricted (closed). On the other hand, when the brightness of the display unit 101 is relatively lower, the iris of the test subject shrinks and the pupil becomes relatively mydriatic (open). Moreover, the size of the pupil of the test subject changes not only due to the brightness of the display unit 101, and sometimes also changes according to the environmental factors such as the surrounding brightness of the test subject.

Figure 7:
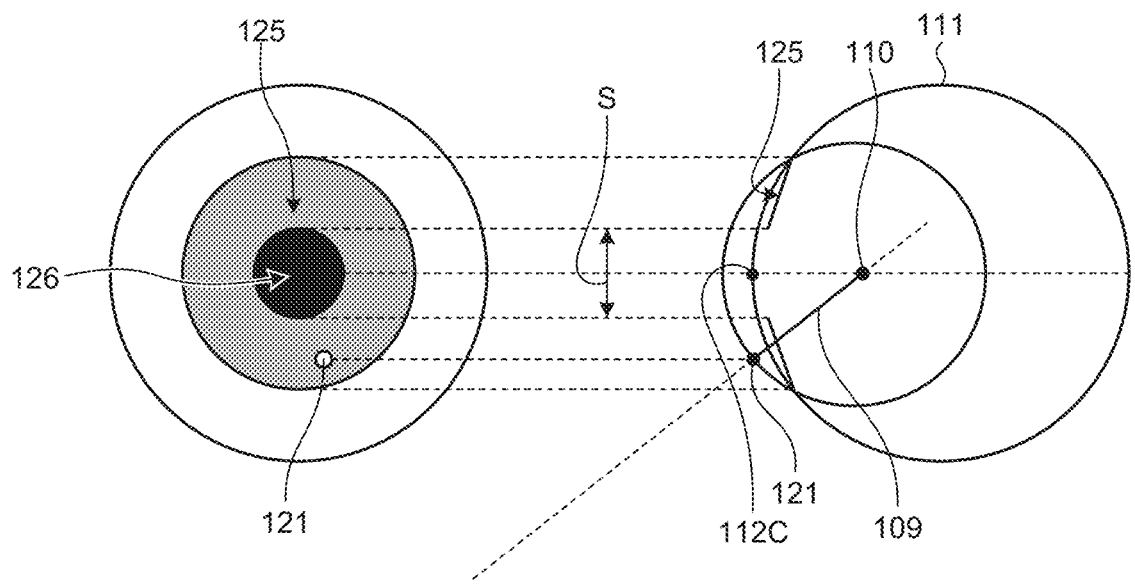
FIG. 7 is a diagram illustrating an exemplary state of the pupil in the eyeball.
Figure 8:
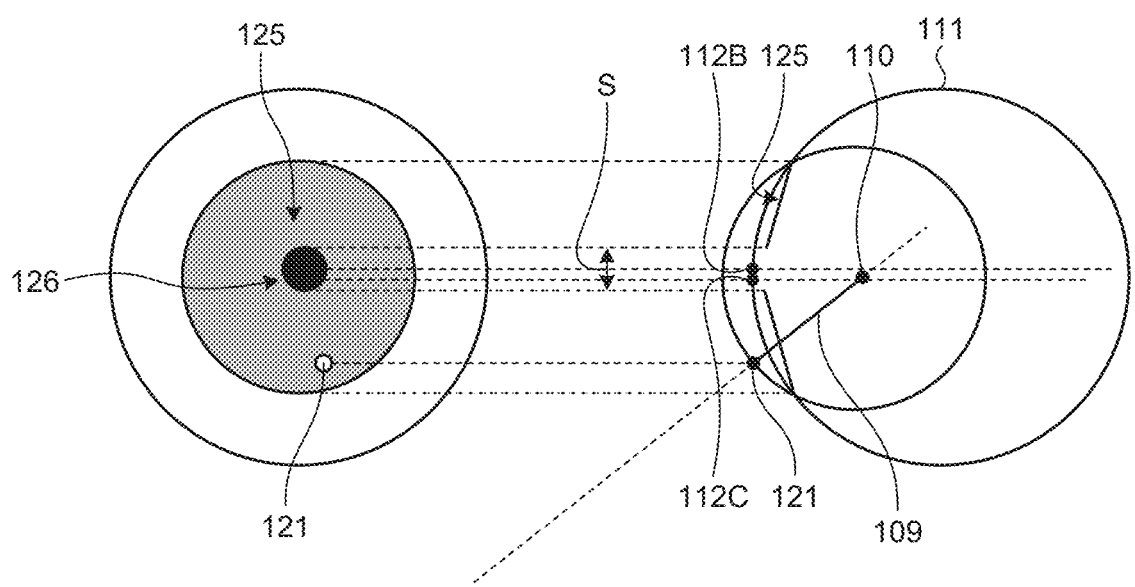
FIG. 8 is a diagram illustrating an exemplary state of the pupil in the eyeball.

FIGS. 7 and 8 are diagrams illustrating exemplary states of the pupil in the eyeball. In FIG. 7, the mydriatic state is illustrated. In FIG. 8, the constricted state is illustrated. In FIGS. 7 and 8 is illustrated the example in which the size of a pupil 126 changes due to the expansion and contraction of an iris 125. In this example, a pupil center 112B in the constricted state is shifted upward with respect to the pupil center 112C in the mydriatic state. From the opposite perspective, the pupil center 112C in the mydriatic state is shifted downward with respect to the pupil center 112B in the constricted state.

For example, the following explanation is given about the case in which the pupil is relatively more constricted during the eye-gaze detecting operation than during the calibration operation. In that case, in the calibration operation, the corneal curvature center of the test subject is calculated under the assumption that its position is as illustrated in FIG. 7. Then, in the eye-gaze detecting operation, the pupil center of the test subject shifts to, for example, the position illustrated in FIG. 8 (the pupil center 112B). In such a condition, the point of intersection of the straight line joining the pupil center 112B and the corneal curvature center 110 with the display unit 101, that is, the detection position of the point of gaze shifts upward with respect to the position being essentially gazed by the test subject.

Figure 9:
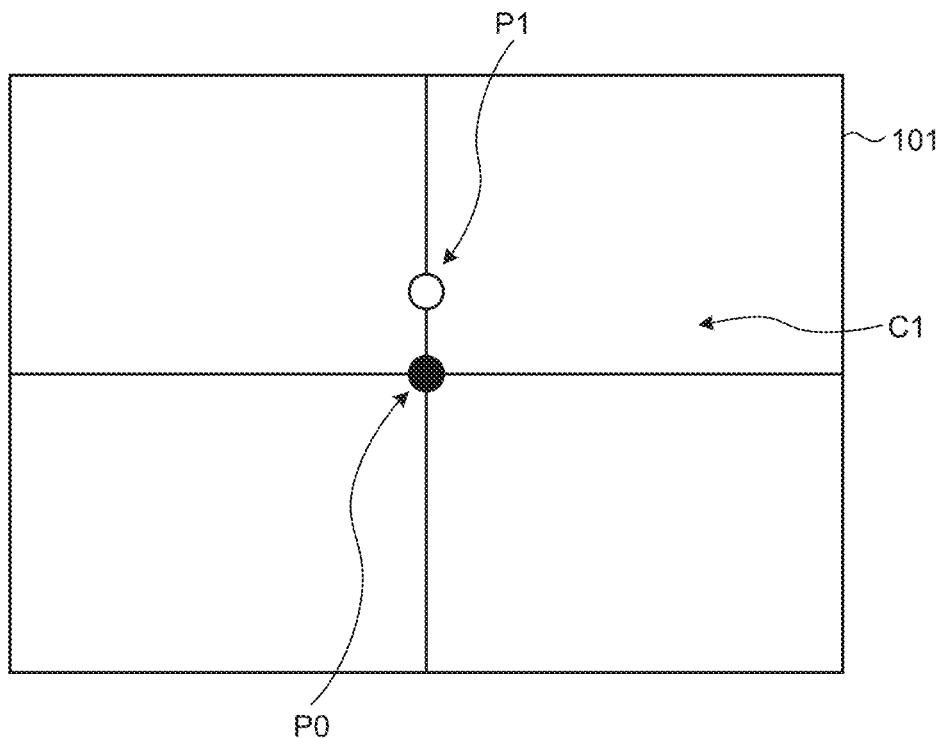
FIG. 9 is a schematic diagram for explaining an example of the eye-gaze detecting operation according to the present embodiment.

FIG. 9 is a schematic diagram for explaining an example of the eye-gaze detecting operation according to the present embodiment. In FIG. 9 is illustrated the case in which a target image P0 is displayed in the middle of the display unit 101 along with a background image C1 that is white in color. As illustrated in FIG. 9, when the background image C1 is white in color, the surrounding the target image P0 becomes brighter as compared to, for example, a gray background image B1 displayed during the abovementioned calibration operation (see FIG. 6). Thus, the pupil diameter of the test subject becomes more constricted as compared to its state during the calibration operation. In that case, as illustrated in FIG. 9, a detection position P1 of the point of gaze shifts upward with respect to the target image P0.

The following explanation is given about the state in which the iris is relatively more mydriatic during the eye-gaze detecting operation than during the calibration operation. In that case, during the calibration operation, the corneal curvature center of the test subject is calculated under the assumption that its position is as illustrated in FIG. 8. Then, in the eye-gaze detecting operation, the pupil center of the test subject shifts to, for example, the position illustrated in FIG. 7 (the pupil center 112C). In the case of calculating the point of gaze of the test subject in such a condition, the point of instruction of the straight line joining the pupil center 112C in the constricted state and the corneal curvature center 110 with the display unit 101 shifts downward with respect to the position being essentially gazed by the test subject.

Figure 10:
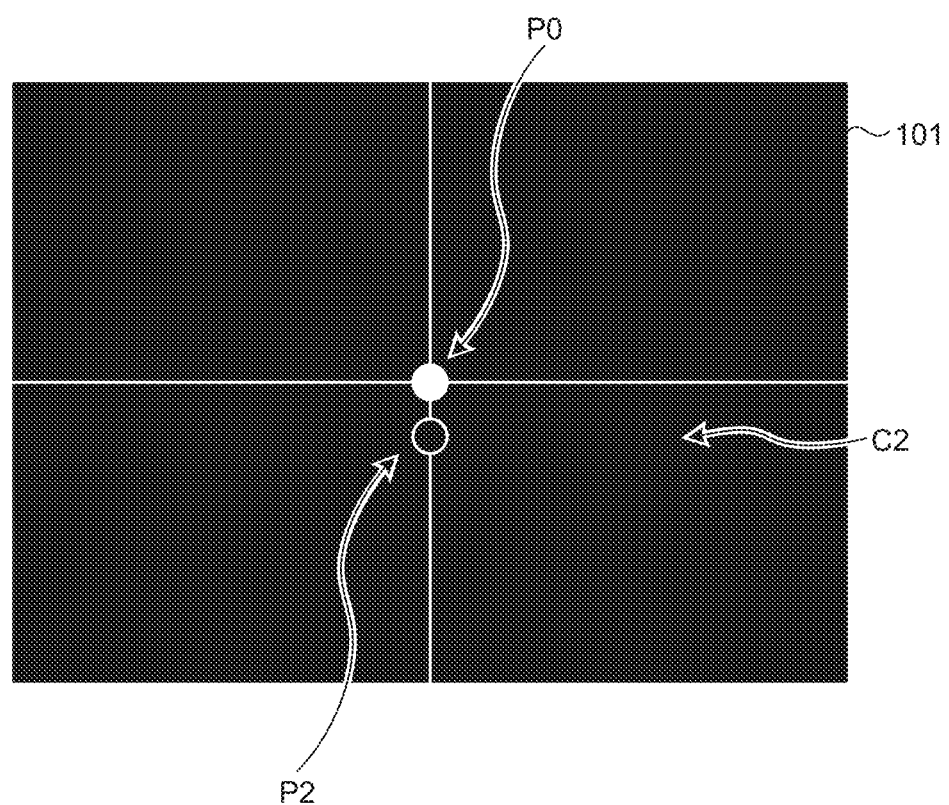
FIG. 10 is a schematic diagram for explaining an example of the eye-gaze detecting operation according to the present embodiment.

FIG. 10 is a schematic diagram for explaining an example of the eye-gaze detecting operation according to the present embodiment. In FIG. 10 is illustrated the case in which the target image P0 is displayed in the middle of the display unit 101 along with a background image C2 that is black in color. As illustrated in FIG. 10, when the background image C2 is black in color, the surrounding of the target image P0 becomes darker as compared to, for example, the gray background image B1 displayed during the abovementioned calibration operation (see FIG. 6). Thus, the pupil diameter of the test subject becomes more mydriatic as compared to its state during the calibration operation. In that case, as illustrated in FIG. 10, the detection position P2 of the point of gaze shifts downward with respect to the target image P0.

In this way, when the size of the pupil is different during the calibration operation than during the eye-gaze detecting operation, there are times when the position of the pupil center changes. In that case, the position being essentially gazed by the test subject does not match with the detecting result, thereby resulting in a decline in the detecting accuracy.

In contrast, in the present embodiment, the pupil diameter of the test subject is calculated during the calibration operation, and the correlation between the pupil diameter and the corneal curvature radius is obtained. Then, at the time of performing the point-of-gaze detection operation, the pupil diameter of the test subject is calculated, and the corneal curvature center is calculated using the corneal curvature radius corresponding to the calculated pupil diameter. As a result, even when the pupil diameter of the test subject undergoes a change, any decline in the detecting accuracy is held down.

Figure 11:
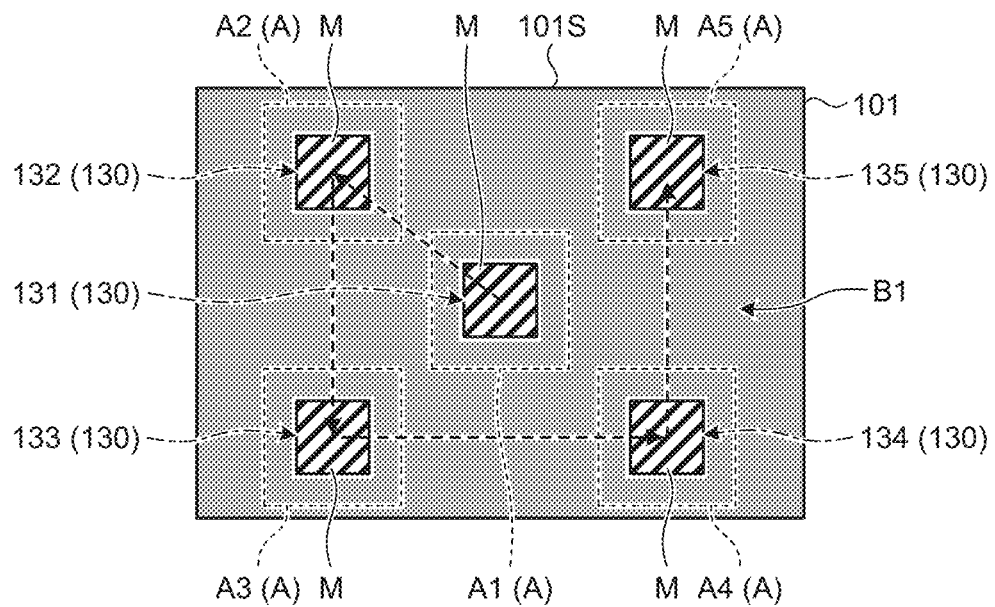
FIG. 11 is a diagram illustrating a display example of displaying a target image in a display unit.

More particularly, during the calibration operation, the display control unit 202 sets the luminance of the display unit 101, and displays the target image at a plurality of target positions 130 in the display unit 101. FIG. 11 is a diagram illustrating a display example of displaying the target image in the display unit 101. As illustrated in FIG. 11, the display control unit 202 displays the background image B1, as well as sequentially displays a target image M at a plurality of target positions 130. Herein, the background image B1 is displayed in gray color. The number of target positions 130 at which the target image M is displayed can be set in advance according to, for example, the input performed by the operator using the input device 60. The display control unit 202 sequentially displays the target image M one at a time at the set count of the target positions 130.

The region setting unit 216 sets, in the display unit 101, correspondence regions A corresponding to the target image M displayed in the display unit 101. As illustrated in FIG. 11, when the target image M is displayed at five target positions 130, namely, a first position 131 to a fifth position 135; the region setting unit 216 sets, for a display period for which the target image M is displayed at each target position 130, the correspondence region A for the concerned target image M. For example, for the display period for which the target image M is displayed at the first position 131, the region setting unit 216 sets a correspondence area A1 corresponding to the target image M at the first position 131. Moreover, for the display period for which the target image M is displayed at the second position 132, the region setting unit 216 sets a correspondence area A2 corresponding to the target image M at the second position 132. Furthermore, for the display period for which the target image M is displayed at the third position 133, the region setting unit 216 sets a correspondence area A3 corresponding to the target image M at the third position 133. Moreover, for the display period for which the target image M is displayed at the fourth position 134, the region setting unit 216 sets a correspondence area A4 corresponding to the target image M at the fourth position 134. Furthermore, for the display period for which the target image M is displayed at the second position 132, the region setting unit 216 sets a correspondence area A5 corresponding to the target image M at the fifth position 135.

In this way, for the display period in which the target image M is displayed at any position, the first light source 103A and the second light source 103B illuminate the eyeball 111. Then, the first camera 102A and the second camera 102B capture images of the eyeball 111 of the test subject. This operation is performed, for example, at the period of the frame synchronization signal (for example, after every 50 [msec]) output from the first camera 102A and the second camera 102B.

The calibration control unit 222 obtains the image data of the right and left eyeballs using the image data acquisition unit 206. Moreover, the calibration control unit 222 detects the position data of the pupil center and the position data of the corneal reflection center using the position detection unit 210; and calculates the position data of the corneal curvature center 110 using the curvature center calculation unit 212 as well as calculates the corneal curvature radius 127. Then, based on the calculation result, the calibration control unit 222 calculates the position data of the point of gaze using the point-of-gaze detection unit 214.

The pupil diameter calculation unit 211 calculates the pupil diameter of the test subject based on the image data acquired by the image data acquisition unit 206. Herein, the pupil diameter calculation unit 211 performs, for example, image processing to calculate the dimensions of the pupil; and, under the assumption that the pupil is circular in shape, calculates the pupil diameter from the dimensions. Then, the pupil diameter calculation unit 211 stores the pupil diameter in the memory unit 224.

The determination unit 218 determines whether or not the calculated position data of the point of gaze is present within the correspondence region. If the point of gaze is determined to be present within the target region; then the calibration control unit 222 stores, as valid calibration data in the memory unit 224, various values such as the position data of the point of gaze and the corneal curvature radius 127 calculated at the time of acquiring the position data of the point of gaze.

The calibration control unit 222 varies at least either the luminance of the display unit 101 or the color of the background image, and performs the abovementioned operations for a plurality of times. The type of the color of the background image and the luminance value can be set in advance according to, for example, the input performed by the operator using the input device 60.

Figure 12:
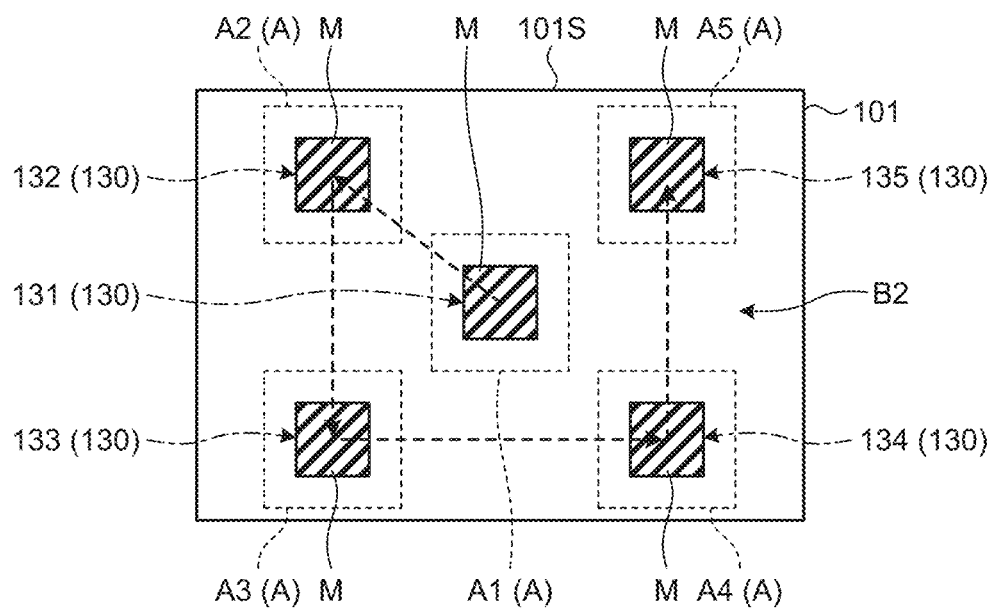
FIG. 12 is a diagram illustrating another display example of displaying the target image in the display unit.

FIG. 12 is a diagram illustrating another display example of displaying the target image in the display unit 101. As illustrated in FIG. 12, the calibration control unit 222 performs the abovementioned operations when, for example, a background image B2 is displayed in white color. In that case, the display control unit 202 displays the white background image B2, and sequentially displays the target image M one at a time at a plurality of target positions 130. Then, in an identical manner to the explanation given earlier, the image data acquisition unit 206 obtains the image data of the right and left eyeballs, and the position detection unit 210 detects the position data of the pupil center and the position data of the corneal reflection center. Moreover, the curvature center calculation unit 212 obtains the position data of the corneal curvature center, and calculates the distance between the corneal curvature center and the pupil center as the corneal curvature radius. Furthermore, the point-of-gaze detection unit 214 obtains the straight line joining the pupil center and the corneal curvature center, and calculates the position data of the point of intersection between that straight line and the display unit 101 as the position data of the point of gaze. Moreover, the pupil diameter calculation unit 211 calculates the pupil diameter of the test subject based on the acquired image data, and stores the pupil diameter in the memory unit 224.

Figure 13:
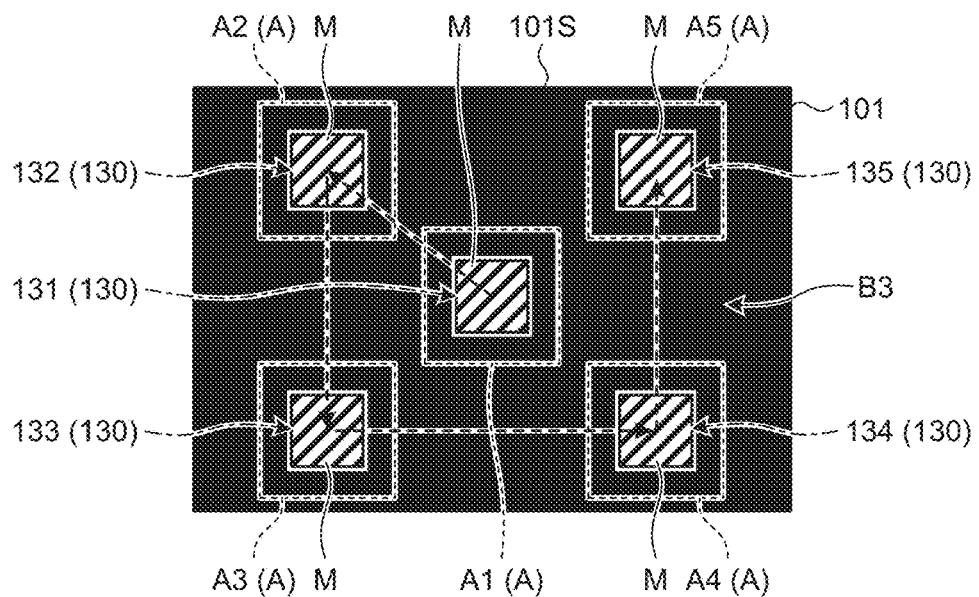
FIG. 13 is a diagram illustrating still another display example of displaying the target image in the display unit.

FIG. 13 is a diagram illustrating still another display example of displaying the target image in the display unit 101. As illustrated in FIG. 13, the display control unit 202 performs the abovementioned operations by, for example, changing the color of the background image from white to black. In that case, the display control unit 202 displays a black background image B3, and sequentially displays the target image M one at a time at a plurality of target positions 130. Then, in an identical manner to the explanation given earlier, the image data acquisition unit 206 obtains the image data of the right and left eyeballs, and the position detection unit 210 detects the position data of the pupil center and the position data of the corneal reflection center. Moreover, the curvature center calculation unit 212 obtains the position data of the corneal curvature center; and calculates the distance between the corneal curvature center and the pupil center as the corneal curvature radius. Furthermore, the point-of-gaze detection unit 214 obtains the straight line joining the pupil center and the corneal curvature center, and calculates the position data of the point of intersection between that straight line and the display unit 101 as the position data of the point of gaze. Moreover, the pupil diameter calculation unit 211 calculates the pupil diameter of the test subject based on the acquired image data, and stores the pupil diameter in the memory unit 224.

Figure 14:
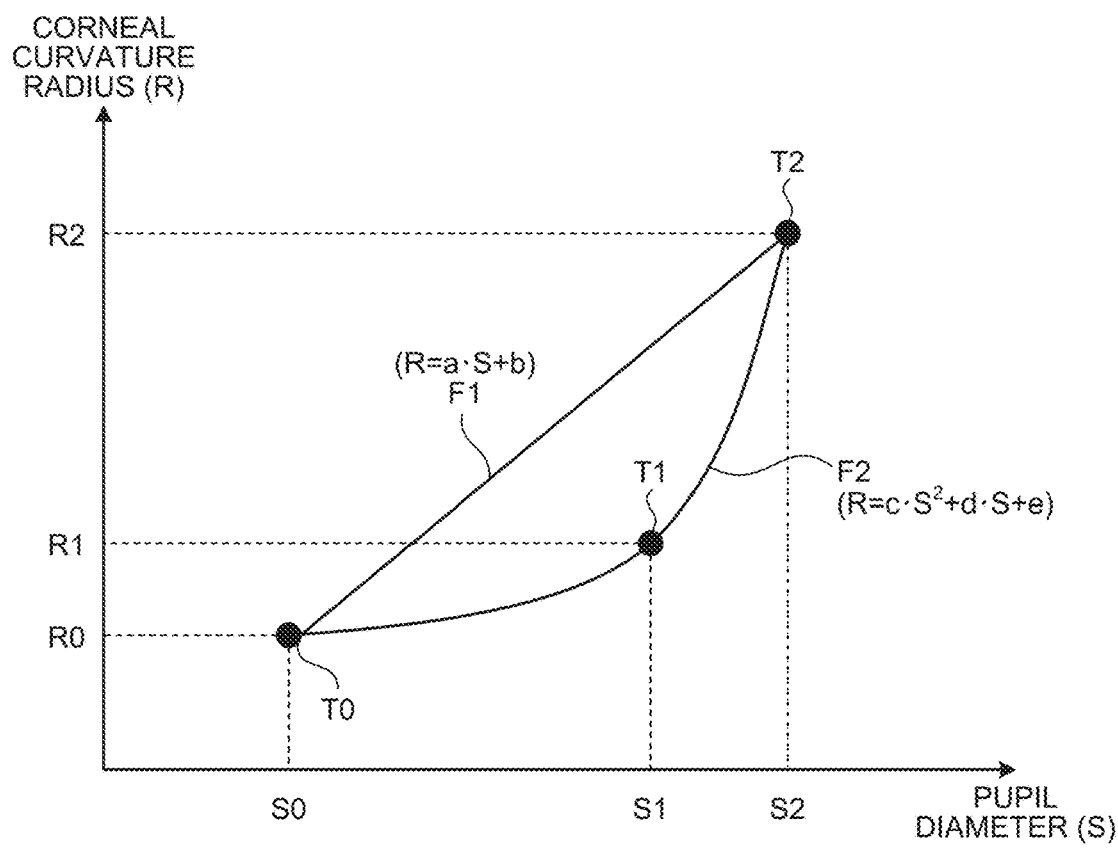
FIG. 14 is a diagram illustrating an example of the correlation between the pupil diameter and the corneal curvature radius.

The calibration control unit 222 associates the pupil diameter and the corneal curvature radius that are calculated in the same instance of operations. In that case, the calibration control unit 222 can use only such pupil diameter and such corneal curvature radius which are determined to be valid calibration data during each instance of operations. FIG. 14 is a diagram illustrating an example of the correlation between the pupil diameter and the corneal curvature radius. As illustrated in FIG. 14, data T0 indicates that, when S0 represents the value of the pupil diameter, R0 represents the value of the corneal curvature radius. Moreover, data T1 indicates that, when S1 represents the value of the pupil diameter, R1 represents the value of the corneal curvature radius. Furthermore, data T2 indicates that, when S2 represents the value of the pupil diameter, R2 represents the value of the corneal curvature radius. Herein, S0<S1<S2 and R0<R1<R2 holds true. In the present embodiment, the data T0 is equivalent to the data in the case of performing the calibration operation when, for example, the background image B2 is white as illustrated in FIG. 12. The data T1 is equivalent to the data in the case of performing the calibration operation when, for example, the background image B1 is gray as illustrated in FIG. 11. The data T2 is equivalent to the data in the case of performing the calibration operation when, for example, the background image B3 is white as illustrated in FIG. 13. Meanwhile, the conditions for acquiring the data T0, T1, and T2 are not limited to the explanation given above.

As illustrated in FIG. 14, based on the values of the pupil diameter and the corneal curvature radius calculated in the calibration operation, the curvature center calculation unit 212 can calculate the value of the corneal curvature radius corresponding to such a pupil diameter which is not calculated in that calibration operation. For example, based on the values of the data T0, T1, and T2, the curvature center calculation unit 212 can obtain relational expressions that model the correlation between the pupil diameter and the corneal curvature radius. If a variable R represents the value of the pupil diameter and if a variable S represents the value of the corneal curvature radius, then the curvature center calculation unit 212 can obtain the correlation between the pupil diameter S and the corneal curvature radius R as, for example, a relational expression F1 ($R=a \cdot S+b$) and a relational expression F2 ($R=c \cdot S^2+d \cdot S+e$) as illustrated in FIG. 14. Herein, a, b, c, d, and e represent constant numbers. Based on such relational expressions, the curvature center calculation unit 212 can calculate the value of the corneal curvature radius R corresponding to such a pupil diameter S which is not calculated in the calibration operation.

Subsequently, the point-of-gaze detection operation is performed. In the eye-gaze detecting operation, in an identical manner to the calibration operation, the first light source 103A and the second light source 103B illuminate the eyeball 111. Then, the first camera 102A and the second camera 102B capture images of the eyeball 111. Based on the image data of the eyeball 111 acquired by the image data acquisition unit 206, the position detection unit 210 detects the position data of the pupil center 112C and the position data of the corneal reflection center 113C.

The curvature center calculation unit 212 obtains the straight line 173 that joins the virtual light source 103V and the corneal reflection center 113C. Moreover, the pupil diameter calculation unit 211 calculates the pupil diameter of the test subject based on the acquired image data. The curvature center calculation unit 212 uses the correlation between the pupil diameter and the corneal curvature radius as obtained in the calibration operation, and calculates the value of the corneal curvature radius corresponding to the calculated value of the pupil diameter. Moreover, the curvature center calculation unit 212 obtains, as the position data of the corneal curvature center 110, the position data separated from the corneal reflection center 113C by a distance equivalent to the corneal curvature radius 127 with respect to the inside of the eyeball 111. The point-of-gaze detection unit 214 obtains the straight line 178 that joins the pupil center 112C and the corneal curvature center 110, and calculates the position data of the intersection point 166 between the straight line 178 and the display unit 101 as the position data of the point of gaze.

Figure 15:
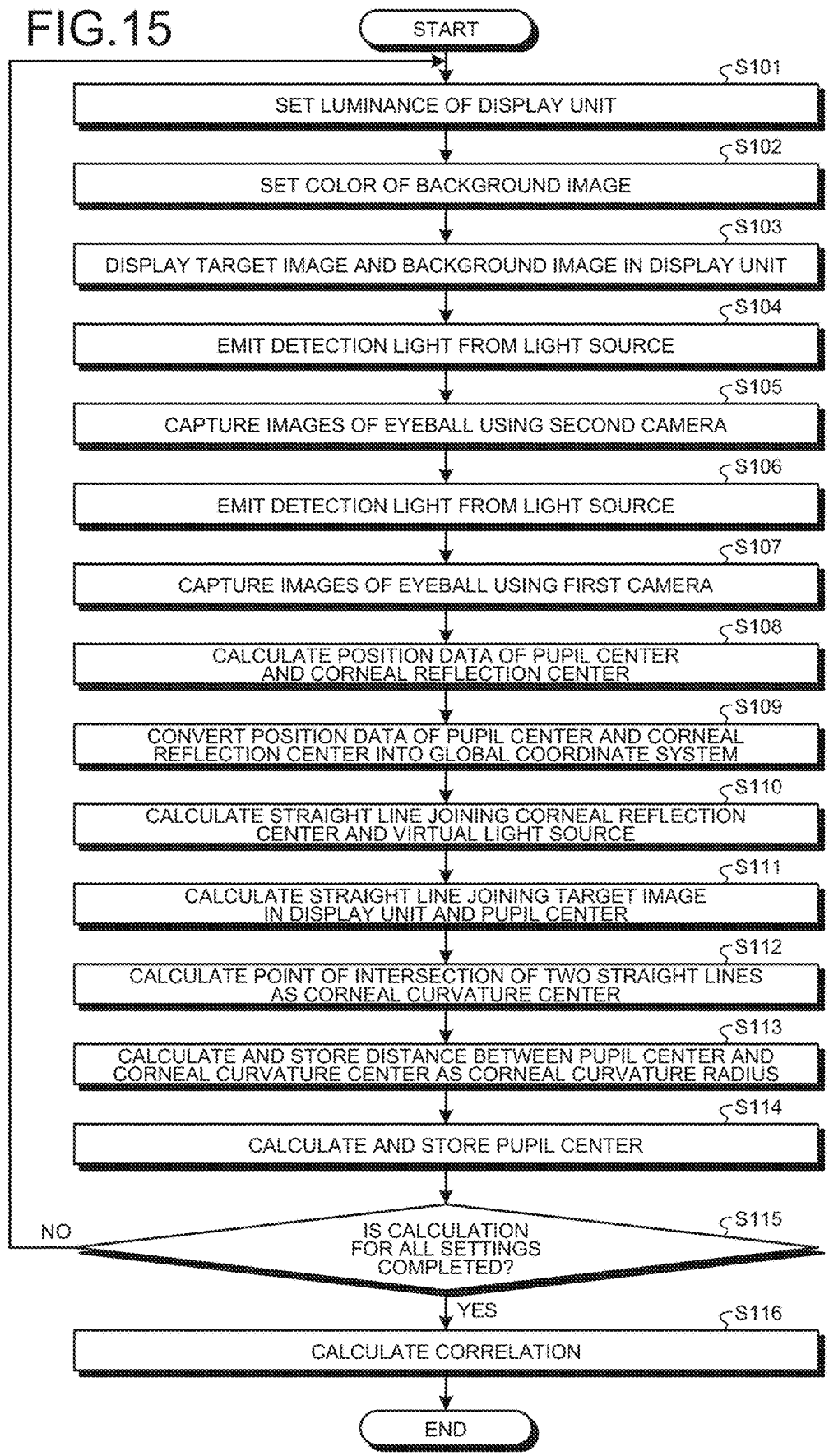
FIG. 15 is a flowchart for explaining an example of the calibration operation performed in an eye-gaze detecting method according to the present embodiment.

Explained below with reference to FIGS. 15 and 16 is an example of the eye-gaze detecting method according to the present embodiment. FIG. 15 is a flowchart for explaining an example of the calibration operation performed in the eye-gaze detecting method according to the present embodiment. FIG. 16 is a flowchart for explaining an example of the eye-gaze detecting operation performed in the eye-gaze detecting method according to the present embodiment.

As illustrated in FIG. 15, in the calibration operation, the display control unit 202 sets the luminance of the display unit 101 (Step S101), sets the color of the background image (Step S102), and displays the target image and the background image in the display unit 101 (Step S103). The region setting unit 216 sets, in the display unit 101, the correspondence regions A corresponding to the target image M displayed in the display unit 101.

The first light source 103A and the second light source 103B illuminate the eyeball 111. Then, the first camera 102A and the second camera 102B capture images of the eyeball 111 of the test subject. For example, when the detection light is emitted from the first light source 103A (Step S104), the second camera 102B captures images of the eyeball 111 (Step S105). On the other hand, when the detection light is emitted from the second light source 103B (Step S106), the first camera 102A captures images of the eyeball 111 (Step S107).

The image data acquisition unit 206 acquires the image data of the right and left eyeballs. The position detection unit 210 detects the position data of the pupil center and the position data of the corneal reflection center (Step S108), and converts each set of position data into the global coordinate system (Step S109).

The curvature center calculation unit 212 acquires the first straight line 141 that joins the virtual light source 103V and the corneal reflection center 113C (Step S110). Moreover, the curvature center calculation unit 212 obtains the second straight line 142 that joins the target position 130 and the pupil center 112C (Step S111). Then, the curvature center calculation unit 212 obtains the point of intersection between the first straight line 141 and the second straight line 142 as the position data of the corneal curvature center 110 (Step S112). Subsequently, the curvature center calculation unit 212 calculates the distance between the corneal curvature center 110 and the pupil center 112C as the corneal curvature radius 127 (Step S113). The point-of-gaze detection unit 214 obtains the straight line joining the pupil center 112C and the corneal curvature center 110, and calculates the position data of the point of intersection between that straight line and the display unit 101 as the position data of the point of gaze.

The pupil diameter calculation unit 211 calculates the pupil diameter of the test subject based on the image data acquired by the image data acquisition unit 206, and stores the calculated pupil diameter in the memory unit 224 (Step S114). The determination unit 218 determines whether or not the calculated position data of the point of gaze is present in the correspondence region. If the point of gaze is determined to be present in the target region, then the calibration control unit 222 stores, as valid calibration data in the memory unit 224, various values such as the position data of the point of gaze and the corneal curvature radius 127 calculated at the time of acquiring the position data of the point of gaze.

The calibration control unit 222 determines whether or not the pupil diameter and the corneal curvature radius is calculated for all luminance values of the display unit 101 and all colors of the background image as set in advance (Step S115). At Step S115, if it is determined that all calculations have been completed for all types of settings (Yes at Step S115), then the calibration control unit 222 calculates the correlation between the pupil diameter and the corneal curvature radius based on the calculation result (Step S116). It marks the end of the calibration operation. On the other hand, at Step S115, if it is determined that all calculations are not yet completed for all types of settings (No at Step S115), then the operations from Step S101 onward are performed again. In that case, the calibration control unit 222 varies at least either the luminance of the display unit 101 or the color of the background image, and again performs the operations explained above.

After the calibration operation is ended, the eye-gaze detecting operation is performed. As illustrated in FIG. 16, in the eye-gaze detecting operation, the first light source 103A and the second light source 103B illuminate the eyeball 111. Moreover, the first camera 102A and the second camera 102B capture images of the eyeball 111 of the test subject. In an identical manner to the calibration operation, for example, when the detection light is emitted from the first light source 103A (Step S201), the second camera 102B captures images of the eyeball 111 (Step S202). On the other hand, when the detection light is emitted from the second light source 103B (Step S203), the first camera 102A captures images of the eyeball 111 (Step S204).

The image data acquisition unit 206 acquires the image data of the right and left eyeballs. The position detection unit 210 detects the position data of the pupil center and the position data of the corneal reflection center (Step S205), and converts each set of position data into the global coordinate system (Step S206).

The curvature center calculation unit 212 obtains the straight line 173 that joins the virtual light source 103V and the corneal reflection center 113C (Step S207). Moreover, the pupil diameter calculation unit 211 calculates the pupil diameter of the test subject based on the image data acquired by the image data acquisition unit 206 (Step S208).

The curvature center calculation unit 212 uses the correlation obtained in the calibration operation, and calculates the corneal curvature radius corresponding to the pupil diameter calculated by the pupil diameter calculation unit 211 (Step S209). The curvature center calculation unit 212 obtains, as the position data of the corneal curvature center 110, the position separated from the corneal reflection center 113C by a distance equivalent to the corneal curvature radius 127 with respect to the inside of the eyeball 111 (Step S210). The point-of-gaze detection unit 214 obtains the straight line 178 that joins the pupil center 112C and the corneal curvature center 110 (Step S211), and calculates the position data of the intersection point 166 between the straight line 178 and the display unit 101 as the position data of the point of gaze (Step S212). Then, the point-of-gaze detection unit 214 stores the position data of the intersection point 166 as the position data of the point of gaze in the memory unit 224 (Step S213).

As explained above, the eye-gaze detecting device 100 according to the present embodiment includes: the display unit 101 configured to display images; the illumination device 103 configured to irradiate at least one eyeball 111 of the test subject with the detection light; the image data acquisition unit 206 configured to acquire the image data of the eyeball 111 irradiated with the detection light; the position detection unit 210 configured to, from the acquired image data, detect the position data of the pupil center indicating the center of the pupil of the eyeball 111 irradiated with the detection light and detect the position data of the corneal reflection center indicating the center of the corneal reflection; the pupil diameter calculation unit 211 configured to calculate the pupil diameter of the test subject from the acquired image data; the curvature center calculation unit 212 configured to calculate the corneal curvature radius corresponding to the pupil diameter based on the calculated pupil diameter, and obtain the position data of the corneal curvature center based on the position data of the corneal reflection center and the calculated value of the corneal curvature radius; and the point-of-gaze detection unit 214 configured to calculate, based on the position data of the pupil center and the position data of the corneal curvature center, the position data of the point of gaze of the test subject on the plane that includes the display unit 101.

The eye-gaze detecting method according to the present embodiment includes: bombarding the detection light onto at least one eyeball 111 of the test subject; acquiring the image data of the eyeball 111 onto which the detection light is bombarded; detecting, from the acquired image data, the position data of the pupil center indicating the center of the pupil of the eyeball 111 onto which the detection light is bombarded and the position data of the corneal reflection center indicating the center of the corneal reflection; calculating the pupil diameter of the test subject from the acquired image data; calculating the corneal curvature radius corresponding to the pupil diameter based on the calculated pupil diameter, and acquiring the position data of the corneal curvature center based on the position data of the corneal reflection center and the calculated value of the corneal curvature radius; and calculating, based on the position data of the pupil center and the position data of the corneal curvature center, the position data of the point of gaze of the test subject on the plane that includes the display unit 101.

The eye-gaze detecting detection program according to the present embodiment causes a computer to execute: bombarding the detection light onto at least one eyeball 111 of the test subject; acquiring the image data of the eyeball 111 onto which the detection light is bombarded; detecting, from the acquired image data, the position data of the pupil center indicating the center of the pupil of the eyeball 111 onto which the detection light is bombarded and the position data of the corneal reflection center indicating the center of the corneal reflection; calculating the pupil diameter of the test subject from the acquired image data; calculating the corneal curvature radius corresponding to the pupil diameter based on the calculated pupil diameter, and acquiring the position data of the corneal curvature center based on the position data of the corneal reflection center and the calculated value of the corneal curvature radius; and calculating, based on the position data of the pupil center and the position data of the corneal curvature center, the position data of the point of gaze of the test subject on the plane that includes the display unit 101.

With such a configuration, at the time of performing the point-of-gaze detection operation, the pupil diameter of the test subject is calculated, and the corneal curvature center is calculated using the corneal curvature radius corresponding to the calculated pupil diameter. As a result, even when the position of the pupil center changes due to a change in the pupil diameter of the test subject, it becomes possible to hold down a decline in the detecting accuracy of the eye-gaze detecting.

In the eye-gaze detecting device 100 according to the present embodiment, based on a predetermined correlation between the pupil diameter and the corneal curvature radius, the curvature center calculation unit 212 obtains the corneal curvature radius corresponding to the calculated pupil diameter. In that case, the predetermined correlation is obtained in the following manner. The operation in which the target image and the background image are displayed in the display unit 101 and the detection light is bombarded from the illumination device 103 onto at least one eyeball 111 of the test subject, in which the image data of the eyeball 111 is acquired using the image data acquisition unit 206, in which the position data of the pupil center and the position data of the corneal reflection center is detected from the acquired image data, in which the first straight line joining the reference position of the illumination device 103 and the corneal reflection center is obtained, in which the second straight line joining the target image and the pupil center is obtained, and in which the distance from the point of intersection between the first straight line and the second straight line to the pupil center is calculated as the corneal curvature radius; and an operation in which the pupil diameter of the test subject is calculated based on the image data are performed for a plurality of number of times by varying at least either the luminance of the display unit 101 or the color of the background image. Then, the pupil diameter and the corneal curvature radius calculated in each instance of operations are associated, and the predetermined correlation is obtained. With such a configuration, in the point-of-gaze detection operation, at the time of acquiring the corneal curvature radius corresponding to the calculated pupil diameter, the correlation between the pupil diameter and the corneal curvature radius can be used regarding the case in which there are a plurality of different pupil diameters. As a result, the detecting accuracy of the eye-gaze detecting can be enhanced.

In the eye-gaze detecting device 100 according to the present embodiment, based on the pupil diameter calculated during the operation and based on the corneal curvature radius, the curvature center calculation unit 212 calculates the corneal curvature radius corresponding to such a pupil diameter which was not calculated during the operation. As a result, the detecting accuracy of the detecting detection can be further enhanced.

Herein, although the present disclosure is described with reference to the abovementioned embodiment for a complete and clear disclosure, the appended claims are not to be thus limited but are to be construed as embodying all modifications and alternative constructions that may occur to one skilled in the art that fairly fall within the basic teaching herein set forth. Moreover, the constituent elements explained above can be appropriately combined. Furthermore, the constituent elements can be deleted, substituted, or modified without departing from the scope of the embodiment described above.

For example, in the embodiment described above, the explanation is given about a configuration in which the correlation between the pupil diameter and the corneal curvature radius as calculated in the calibration operation is used in the eye-gaze detecting operation performed later. However, that is not the only possible case. Alternatively, when the correlation between the pupil diameter and the corneal curvature radius is already calculated during, for example, the calibration operation in or before the previous instance, the calculation operation for calculating the correlation can be omitted during the calibration operation performed in the next instance onward, and the eye-gaze detecting operation can be performed using the already-calculated correlation.

Moreover, in the embodiment described above, for example, without calculating the pupil diameter during the initial instance of performing the eye-gaze detecting operation, the position data of the point of gaze can be calculated using a predetermined value of the corneal curvature radius; and, when any misalignment is detected between the calculated position of the point of gaze and the position of the target image M, during the next instance of performing the eye-gaze detecting operation, the corneal curvature radius corresponding to the pupil diameter can be used in an identical manner to the embodiment described above.

The computer program for performing the eye-gaze detecting method described above may be provided by being stored in a non-transitory computer-readable storage medium, or may be provided via a network such as the Internet. Examples of the computer-readable storage medium include optical discs such as a digital versatile disc (DVD) and a compact disc (CD), and other types of storage devices such as a hard disk and a semiconductor memory.

According to the present disclosure, it is possible to provide an eye-gaze detecting device, an eye-gaze detecting method, and an eye-gaze detecting program that enable holding down a decline in the detecting accuracy.

The eye-gaze detecting device, the eye-gaze detecting method, and the eye-gaze detecting program according to the present disclosure can be used in a processing device such as a computer.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An eye-gaze detecting device comprising:
a display unit configured to display an image;
a light source configured to irradiate an eyeball of a test subject with detection light;
an image data acquisition unit configured to acquire image data of the eyeball irradiated with the detection light;
a position detection unit configured to detect, from the image data, position data of a pupil center indicating a center of pupil of the eyeball and position data of a corneal reflection center indicating a center of corneal reflection;
a pupil diameter calculation unit configured to calculate a pupil diameter of the test subject from the image data;
a curvature center calculation unit configured to determine a value of a corneal curvature radius corresponding to the pupil diameter based on a correlation between the pupil diameter and the corneal curvature radius calculated in advance by calibration processing, and to determine position data of a corneal curvature center based on the position data of the corneal reflection center and the value of the corneal curvature radius; and a point-of-gaze detection unit configured to calculate, based on the position data of the pupil center and the position data of the corneal curvature center, position data of a point of gaze of the test subject on a plane which includes the display unit.

2. The eye-gaze detecting device according to claim 1, wherein the image comprises a background image and a target image, and the predetermined correlation is obtained by performing, a plurality of number of times for varying values of a luminance of the display unit or varying colors of the background image,
- a first operation in which the target image and the background image are displayed in the display unit, the eyeball of the test subject is irradiated with the detection light from the light source, the image data of the eyeball is acquired by the image data acquisition unit, the position data of the pupil center and the position data of the corneal reflection center are detected from the image data, a first straight line joining a reference position of the light source and the corneal reflection center is determined, a second straight line joining the target image and the pupil center is determined, and a distance between a point of intersection of the first straight line and the second straight line and the pupil center is calculated as the corneal curvature radius, and
- a second operation in which the pupil diameter of the test subject is calculated based on the image data, and associating the pupil diameter and the corneal curvature radius calculated in each instance of the performing of the first operation or the second operation.

3. An eye-gaze detecting method comprising:

irradiating an eyeball of a test subject with detection light;

acquiring image data of the eyeball irradiated with the detection light;

detecting, from the image data, position data of a pupil center indicating a center of pupil of the eyeball irradiated with the detection light and position data of a corneal reflection center indicating a center of corneal reflection;

calculating a pupil diameter of the test subject from the image data;

obtaining a value of a corneal curvature radius corresponding to the pupil diameter based on a correlation between the pupil diameter and the corneal curvature radius calculated in advance by calibration processing;

determining position data of a corneal curvature center based on the position data of the corneal reflection center and the value of the corneal curvature radius; and calculating, based on the position data of the pupil center and the position data of the corneal curvature center, position data of a point of gaze of the test subject on a plane that includes a display unit.

4. A non-transitory computer-readable storage medium storing a computer program causing a computer to execute:

irradiating an eyeball of a test subject with detection light;

acquiring image data of the eyeball irradiated with the detection light;

detecting, from the image data, position data of a pupil center indicating a center of pupil of the eyeball and position data of a corneal reflection center indicating a center of corneal reflection;

calculating a pupil diameter of the test subject from the acquired image data;

obtaining a value of a corneal curvature radius corresponding to the pupil diameter based on a correlation between the pupil diameter and the corneal curvature radius calculated in advance by calibration processing;

determining position data of a corneal curvature center based on the position data of the corneal reflection center and the value of the corneal curvature radius; and calculating, based on the position data of the pupil center and the position data of the corneal curvature center, position data of a point of gaze of the test subject on a plane including a display unit.

* * * * *